US008374889B2

(12) United States Patent
Arthur (10) Patent No.: US 8,374,889 B2
(45) Date of Patent: Feb. 12, 2013

(54) MULTIPLE-INPUT SELECTABLE SYSTEMS INTEGRATED DISPLAY AND CONTROL FUNCTIONS UNIT FOR ELECTROPHYSIOLOGY AND THE LIKE

(75) Inventor: Thomas Arthur, Anchorage, AK (US)

(73) Assignee: SystemsOne, LLC, Stuart, FL (US)

( * ) Notice: Subject to any disclaimer, the term of this patent is extended or adjusted under 35 U.S.C. 154(b) by 161 days.

(21) Appl. No.: 12/814,170

(22) Filed: Jun. 11, 2010

(65) Prior Publication Data

US 2010/0302156 A1     Dec. 2, 2010

Related U.S. Application Data

(63) Continuation of application No. 11/413,232, filed on Apr. 27, 2006, now abandoned.

(51) Int. Cl.
*G08Q 50/22*     (2012.01)
(52) U.S. Cl. ............... 705/2; 345/2.1; 345/173; 600/300
(58) Field of Classification Search ............... 710/1–74; 345/1.1–3.4, 173–184; 705/1.1–6; 600/300–595
See application file for complete search history.

(56) References Cited

U.S. PATENT DOCUMENTS

| 5,666,113 | A | 9/1997 | Logan |
| 6,557,170 | B1 | 4/2003 | Wilder et al. |
| 7,240,111 | B2* | 7/2007 | VanHarlingen et al. ...... 709/224 |
| 7,567,233 | B2* | 7/2009 | Garibaldi et al. ............. 345/157 |
| 2003/0074228 | A1 | 4/2003 | Walsh |
| 2005/0275641 | A1* | 12/2005 | Franz ............................. 345/204 |
| 2006/0007169 | A1 | 1/2006 | Robbins et al. |
| 2007/0016028 | A1 | 1/2007 | Donaldson et al. |
| 2007/0043596 | A1* | 2/2007 | Donaldson et al. ............... 705/3 |
| 2007/0136498 | A1* | 6/2007 | Tseng et al. .................... 710/73 |
| 2007/0282997 | A1* | 12/2007 | Trochman ..................... 709/224 |

OTHER PUBLICATIONS

Howstuffworks webpage on "How Hard Disks Work" retrieved from the WebArchive as a webpage available in Feb. 2003.
"Structured Wiring How To" webpage retrieved from the WebArchive as a webpage available in Feb. 2003.
USBGEAR webpage on USB serial converters products retrieved from WebArchive as a webpage available in Sep. 2004.

* cited by examiner

*Primary Examiner* — Liliana Cerullo
(74) *Attorney, Agent, or Firm* — William Giltinan; Carlton Fields, PA (57) ABSTRACT

A systems integrator that brings various separate systems into one keyboard, video and mouse configuration with customized viewing of the different monitors on one large screen LCD monitor. This permits a user to control the display of several video/audio inputs simply and efficiently, for many diverse purposes including medical procedures, and other complex operations requiring multiple computer displays and video inputs.

19 Claims, 11 Drawing Sheets

MULTIPLE-INPUT SELECTABLE SYSTEMS INTEGRATED DISPLAY AND CONTROL FUNCTIONS UNIT FOR ELECTROPHYSIOLOGY AND THE LIKE

CROSS REFERENCE TO RELATED APPLICATIONS

This Application is a Continuation Application of utility patent application Ser. No. 11/413,232, filed Apr. 27, 2006 now abandoned, by Thomas Arthur, entitled "MULTIPLE-INPUT SELECTABLE SYSTEMS INTEGRATED DISPLAY AND CONTROL FUNCTIONS UNIT FOR ELECTROPHYSIOLOGY AND THE LIKE," the entirety of all of which are incorporated herein by reference.

STATEMENT REGARDING FEDERALLY SPONSORED RESEARCH AND DEVELOPMENT

Not Applicable

BACKGROUND OF THE INVENTION

1. Field of the Invention

This invention relates to multiple selectable systems integrated display and control functions units and particularly to for multiple selectable systems integrated display and control functions units electrophysiology and the like.

2. Description of the Prior Art

Cardiac Electrophysiology (EP) is a practice of cardiology that uses specialized catheters to map and redirect electrical pathways in the heart. This usually requires the use of other support systems such as physiologic (e.g., BP, HR and Oxygen Saturation or O2Sat) data, catheter navigation equipment (e.g., GE/Pruka, MedSystems, Whitt, Carto, ESI), Ablation modules (e.g., Cryo, EPT), ultrasound equipment e.g., (Intracardiac Echo or ICE), and radiology imaging and pacing modules.

Many of these systems have their own computers, each of which has a separate monitor, keyboard and mouse configuration requiring the technologist or physician to access many different systems separately. This, of course, causes problems because this access must be done quickly. Therefore, not only must the technologist and physician concentrate on the procedure at hand, they must also deal with the technological complexities of these various systems.

This situation can only lead to increased stress for the technologist and physician. Moreover, these complexities can also leads to errors, which may lead to unfortunate consequences for patients.

BRIEF DESCRIPTION OF THE INVENTION

The instant invention overcomes these difficulties. It is a systems integrator that brings various separate systems into one keyboard, video and mouse configuration with customized viewing of the different monitors on one large screen LCD monitor.

Thus, for cardiac electrophysiology, both the physician and EP technologist may control what is being viewed on the LCD monitor through touch pad technology. However, only the technologist has control of the multiple computer inputs with a "Keyboard Video Mouse" (KVM) switch located at the control station.

Because facilities are different, one first establishes what equipment is used in the particular EP lab. A site visit is then arranged to discuss how the technologist and physician interact with the equipment. In some cases, new cabling and relocating equipment to a central location become part of the total solution, which includes decreasing noise and interference and reduces setup time and trouble for the technologist. The system also has recording and archiving software to provide full documentation as well as the integration of modalities in one review station.

The system can also be used in other technology areas as well. In fact, any type of procedure, assembly, or similar type of process that requires individuals to view many different screens that display data of different aspects of the process can use such a system.

Such systems reduce errors, increase efficiency, reduce stress and produce an overall superior result.

DETAILED DESCRIPTION OF THE INVENTION

Note that what is discussed below is a system that is used for cardiac electrophysiology. However, the components, controls and monitors can be used in many other applications. The cardiac electrophysiology system being an example of one of them.

Figure 1:
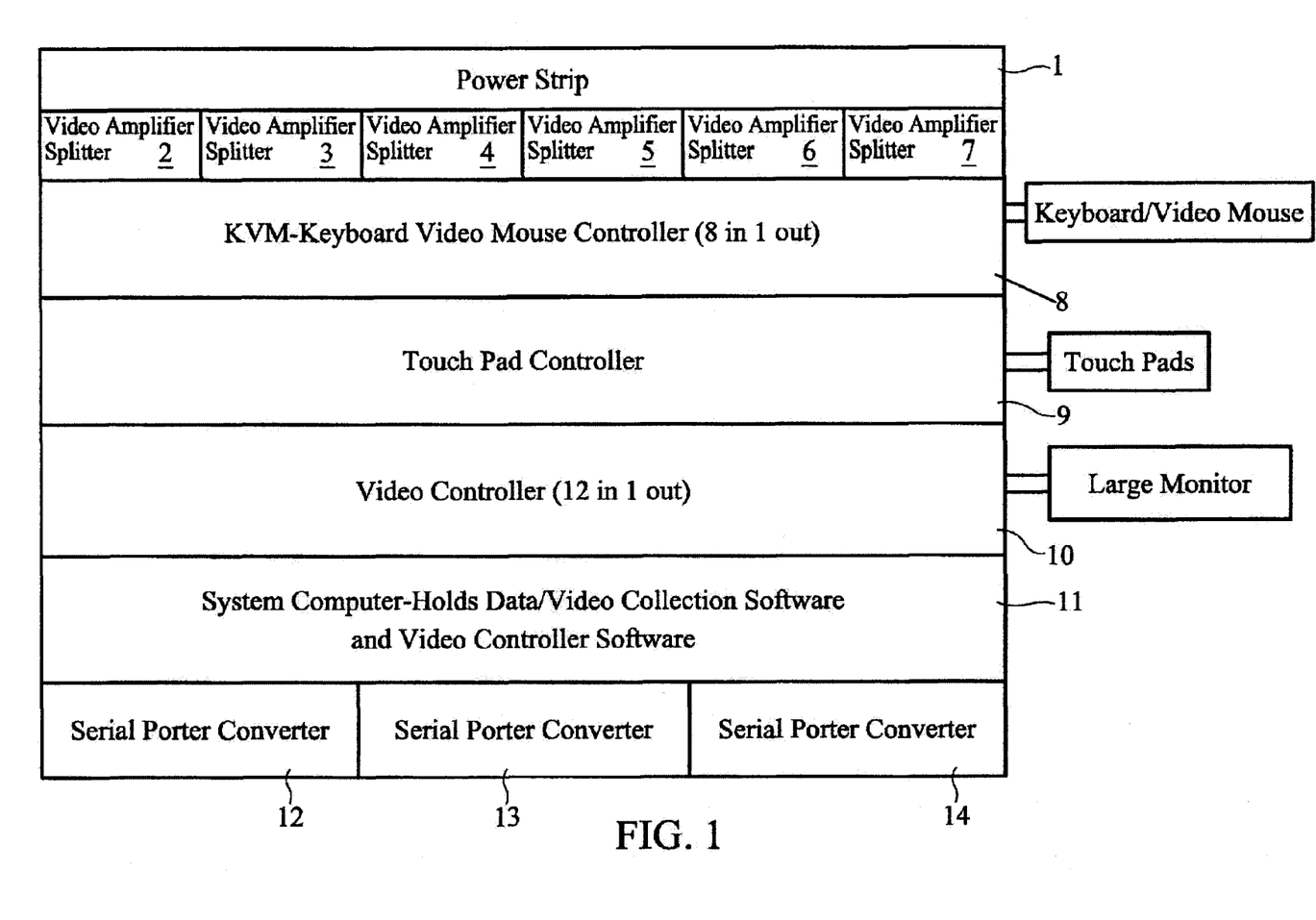
FIG. 1 is a block diagram of the key elements of the system.

FIG. 1 shows the system in block diagram. The system has a power strip 1 that supplies power to the units. This can be any commercial power strip that has sufficient capacity of the units employed. Six video amplifier splitters 2-7 are attached to the power strip. These splitters are used to accept up to six video display inputs to the system. Their purpose is to these boost the signal input up to go much longer distances with no signal quality loss. The video amplifier splitters are commercially available from several companies such as: BLACKBOX, RAM or EXTRON.

The video amplifier splitters are connected Keyboard-Video-Mouse controller (KVM) 8. This is designed to have multiple inputs and one output. In the preferred embodiment, this device is a SERVSWITCH manufactured by BLACKBOX. This item controls multiple computer inputs (keyboard, video and mouse) and sends them out to one viewable/controllable output (e.g. the main display). These devices are connected using standard cabling systems that are well known in the art. A keyboard, video screen(s) and a mouse (mice) are also connected to the KVM controller as shown. A touch pad controller 9 is designed to control at least two touch pads, such as the NXT-CV10 manufactured by AMX. In the preferred embodiment, this controller is an NI 2000 controller manufactured by AMX. This device process all the information that is sent to and from the RGB 3000 Superview or 4000

Superview video controllers (discussed below) as well as the touch panel displays. The touch pads in the exemplary system allow the technician and the physician to display desired screens at a touch of the screen.

A video controller 10 that has 12 inputs and one output is connected to the touch pad controller 9. In the preferred embodiment, the video controller 10 is an RGB 3000 SUPERVIEW or 4000 SUPERVIEW as mentioned above. The video controller provides scalable images that are then sent out to a large-scale LCD monitor (such as a SHARP PN-455). The display of the images is controlled by the two touch pads, as discussed above.

All of these components are connected to a main system computer 11 that allows the users to control the system. This computer can be any generic brand of CPU because the computer hard drive is simply used to store software that is used with the video controller.

Finally, the system has three serial port converters 12-14 that allow other peripherals to be connected to the system.

Figure 2:
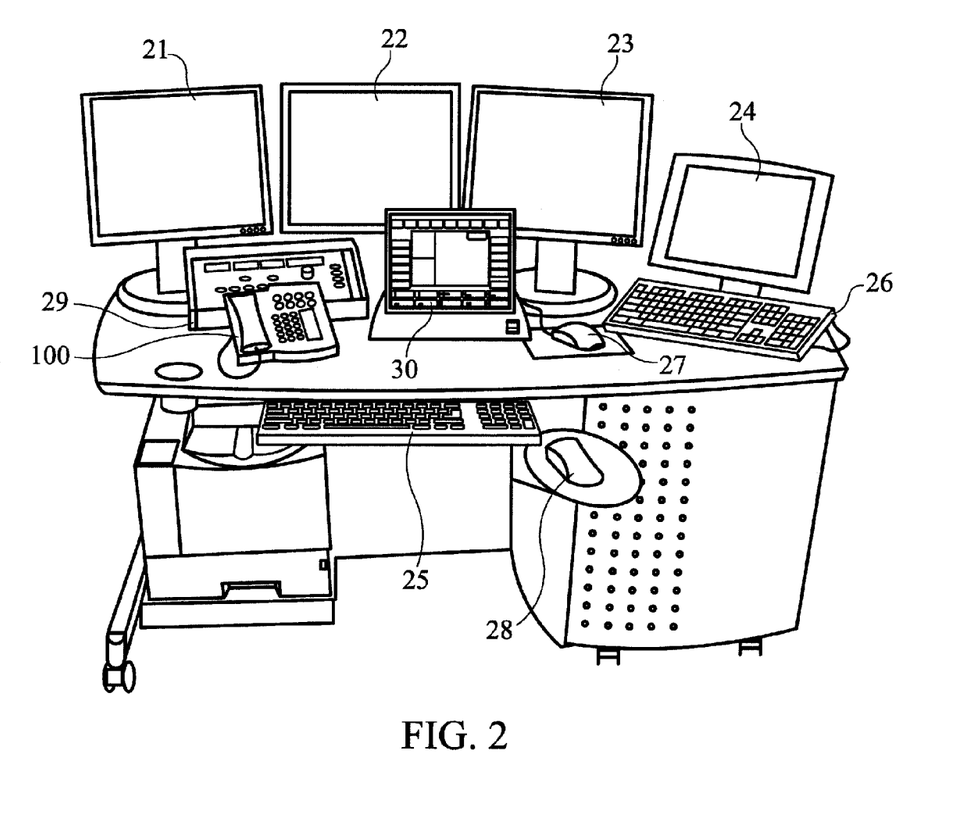
FIG. 2 is a front view of a technician station for this system.

FIG. 2 is a front view of a technician station 20 for this system. The technician's station has a number of computer displays 21-24, keyboards 25 and 26, mice 27 and 28.

A control box 29 and a touch pad 30. Note that the technician's station can have other items, such as a telephone 100 for convenience. Note that the technician's station 20 that is shown is only illustrative. Any other similar workstation can be used. Moreover, the exact configuration and number of components used by the technician will vary from project to project. The various displays, computers and other devices provide the various inputs for the system.

Figure 3:
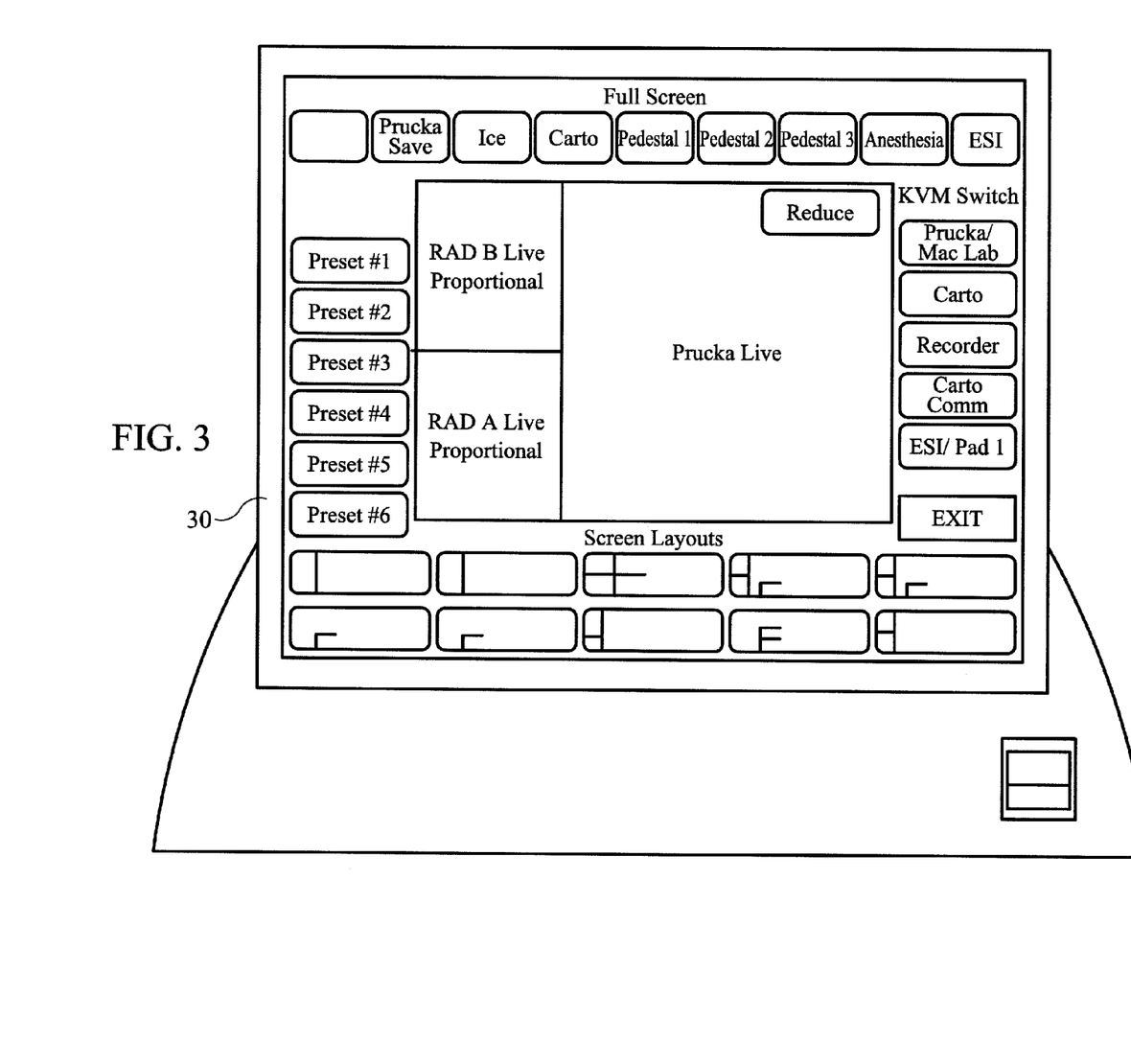
FIG. 3 is a front view of the technician's touch pad control panel.

The key to the system is shown in FIG. 3, which is a front view of the technician's touch pad control panel 30. The touch control pad is designed to be the main controller for the displays that are presented on the main display screen. In the preferred embodiment, this touch screen is manufactured by AMX, as discussed above. Although the touch screen is a commercial product, the display shown on the screen in the figure is custom designed as part of this system.

On the screen are a number of buttons related to the various displays. As shown, these buttons are configured for a specific procedure. As noted above, however, the specific functions can be reworked for any application desired. The center of the touch screen is a representation of what is being projected on the main display screen. A set of buttons on the bottom of the screen shows a number of screen layouts that can be displayed as desired. As shown in the example, the screen shows Rad B live over Rad A live (both radiology screens showing live x-ray pictures) next to a screen showing PRUCKA live (PRUCKA is a computerized electrophysiology diagnostic monitoring system sold by General Electric. This specific screen layout is shown in the center of the lower set of screen layout buttons.

The PRUCKA system is one of several commercial diagnostic monitoring systems used in such procedures. ESI stands for Endocardial Solutions, Inc, which manufactures a line of advanced cardiac mapping devices. CARTO is another system for mapping and displaying the heart.

In addition to the commercial monitoring/mapping systems, conventional monitoring functions, such as Intra Cardiac Echo (ICE button) are also available. All of the displays produced by these systems can easily be displayed alone, or with any of the others, on the main display screen. As noted above, previously, these displays were limited to one display on one monitor.

The left side of the touchpad shows a number of preset buttons, which can be programmed as desired. The use of preset buttons allows the physician to switch displays literally with the touch of a button.

The technician's touch pad also has a set of buttons on left under the title "KVM Switch". These buttons select which inputs are attached to the system. Only the technician has control over the KVM switch functions.

Figure 4:
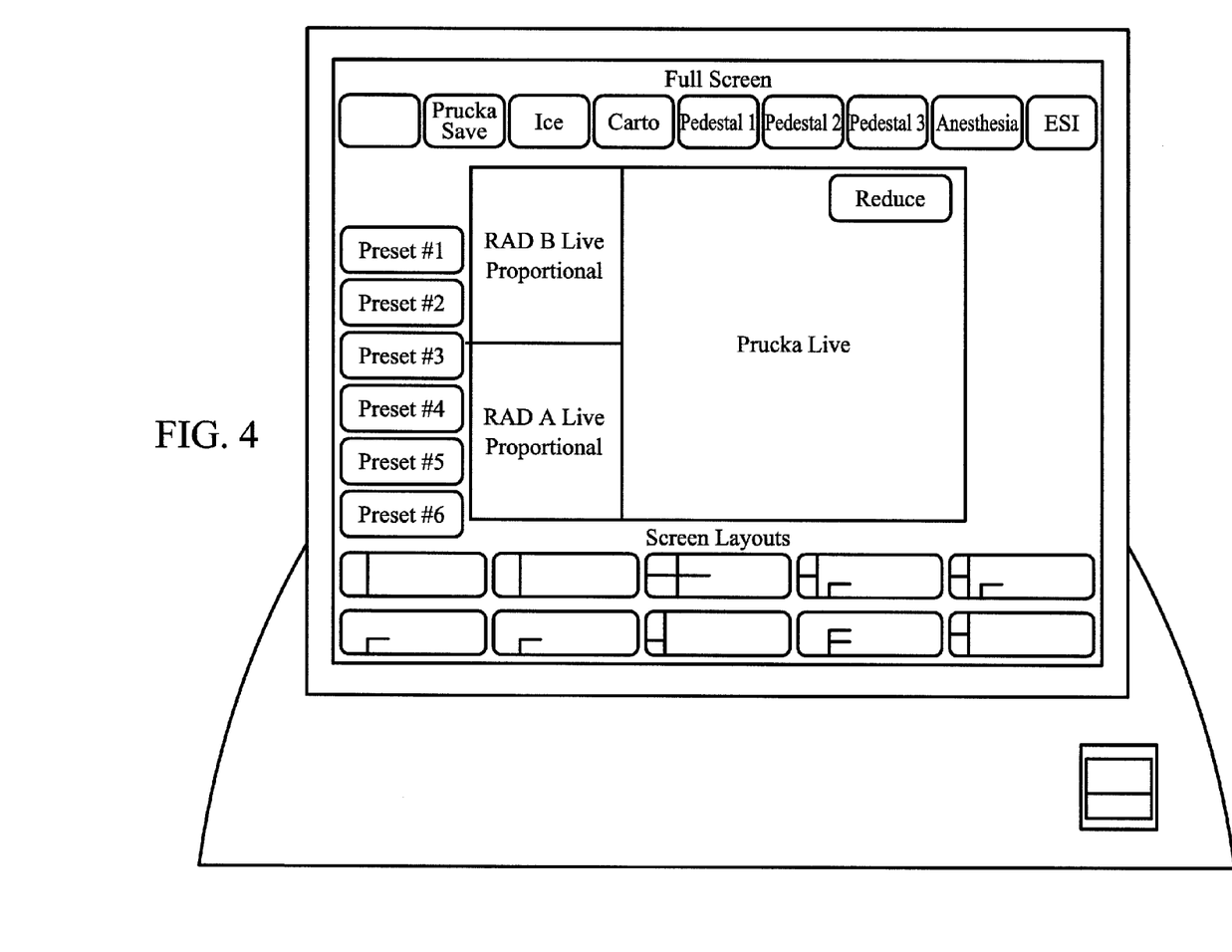
FIG. 4 is a front view of the physician's touch pad control panel.

FIG. 4 is a front view of the physician's touch pad control panel. As noted above, this touch pad has all of the functions discussed above without the KVM switch functions that are available to the technician. In the normal use of the invention, this touch pad is located near the operating table, which easy reach of the physician. Allowing the physician to choose the displays make the process efficient because the physician does not have to tell the technician what to display. Moreover, the possibility of error in miscommunication is eliminated when the physician can choose directly, the displays desired.

Figure 5:
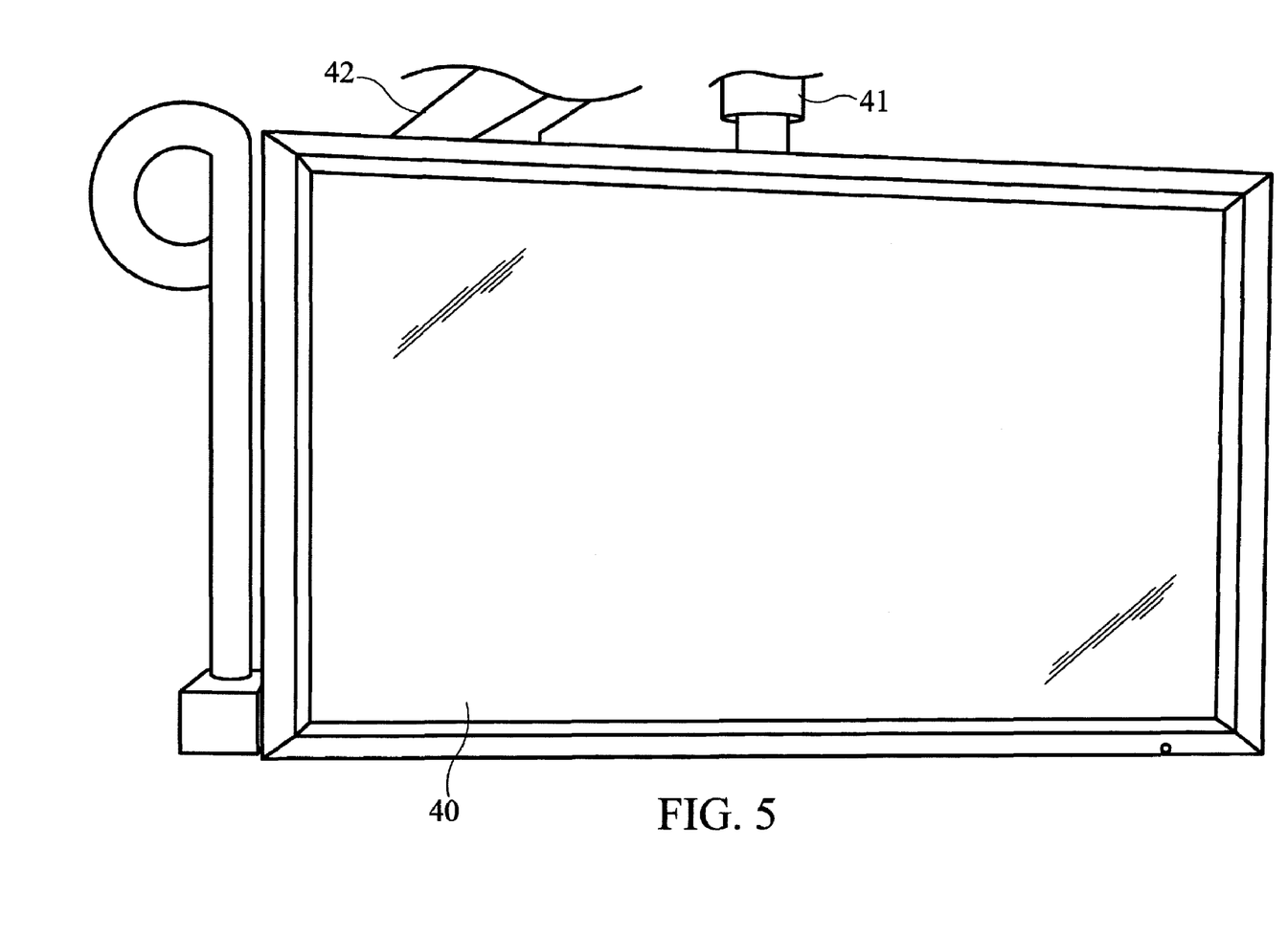
FIG. 5 is a front view of the main display screen.

FIG. 5 is a front view of the main display screen 40. In the preferred embodiment, this screen is a flat panel display. The screen 40 is attached to a pivot arm 41 at connection 42. This allows the screen to be pivoted in any direction for the convenience of the physician and the team involved in the procedure. This figure shows a blank screen.

Figure 6:
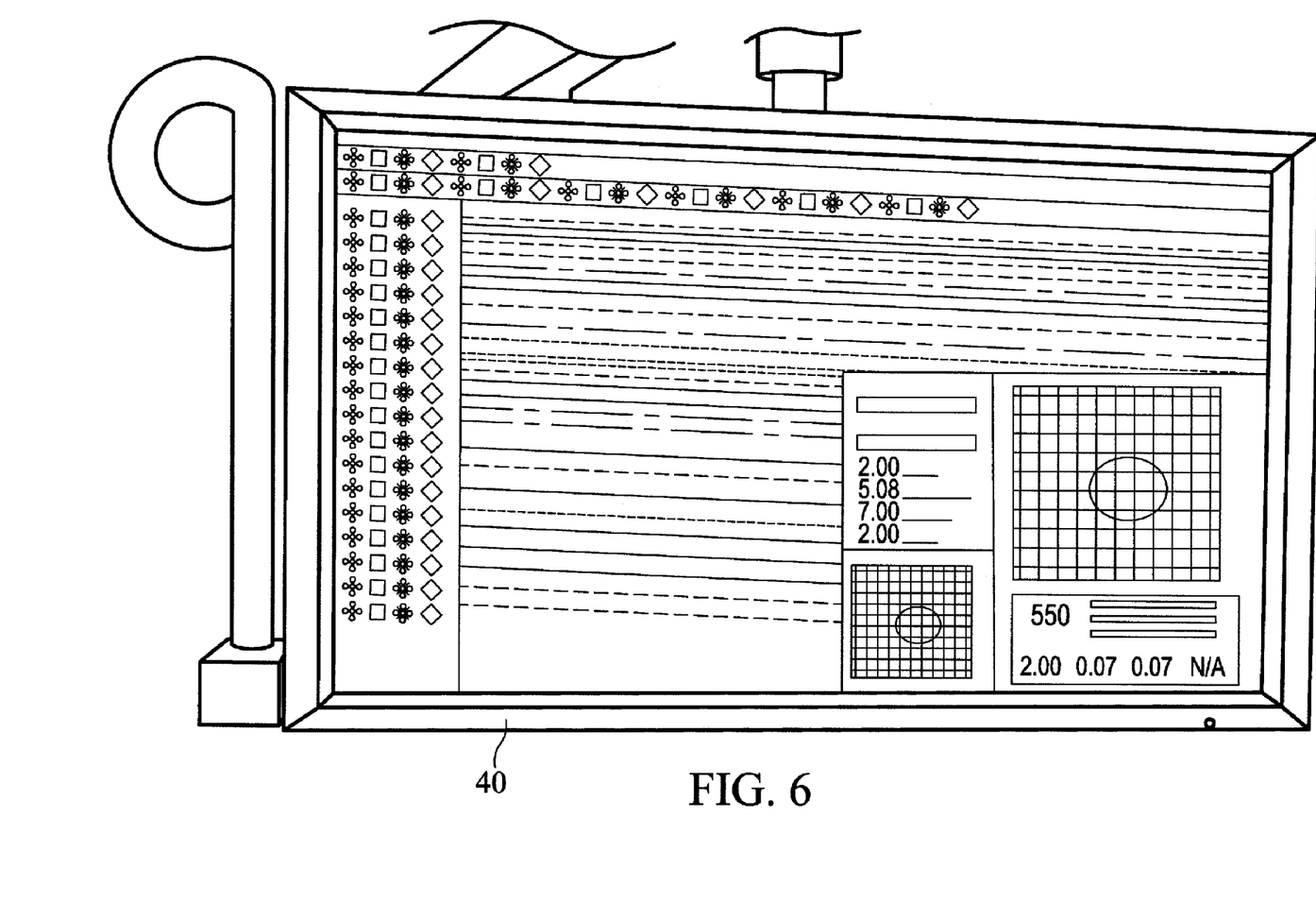
FIG. 6 is a front view of the main display screen showing multiple sample data displays.

FIG. 6 is a front view of the main display screen showing multiple sample data displays. In this figure, the screen is displaying a sample display of a PRUKA output. Superimposed on this displays a sample of a CARTO display.

This figure shows the real advantage of this system. Here, the physician up to six different displays simultaneously. Moreover, the physician can quickly select anyone of them to be enlarged or reduced. In this way, the physician can constantly monitor the patient, and procedure on one screen, which increases efficiency and reduces errors, which increases the overall safety of the procedure.

Figure 7A:
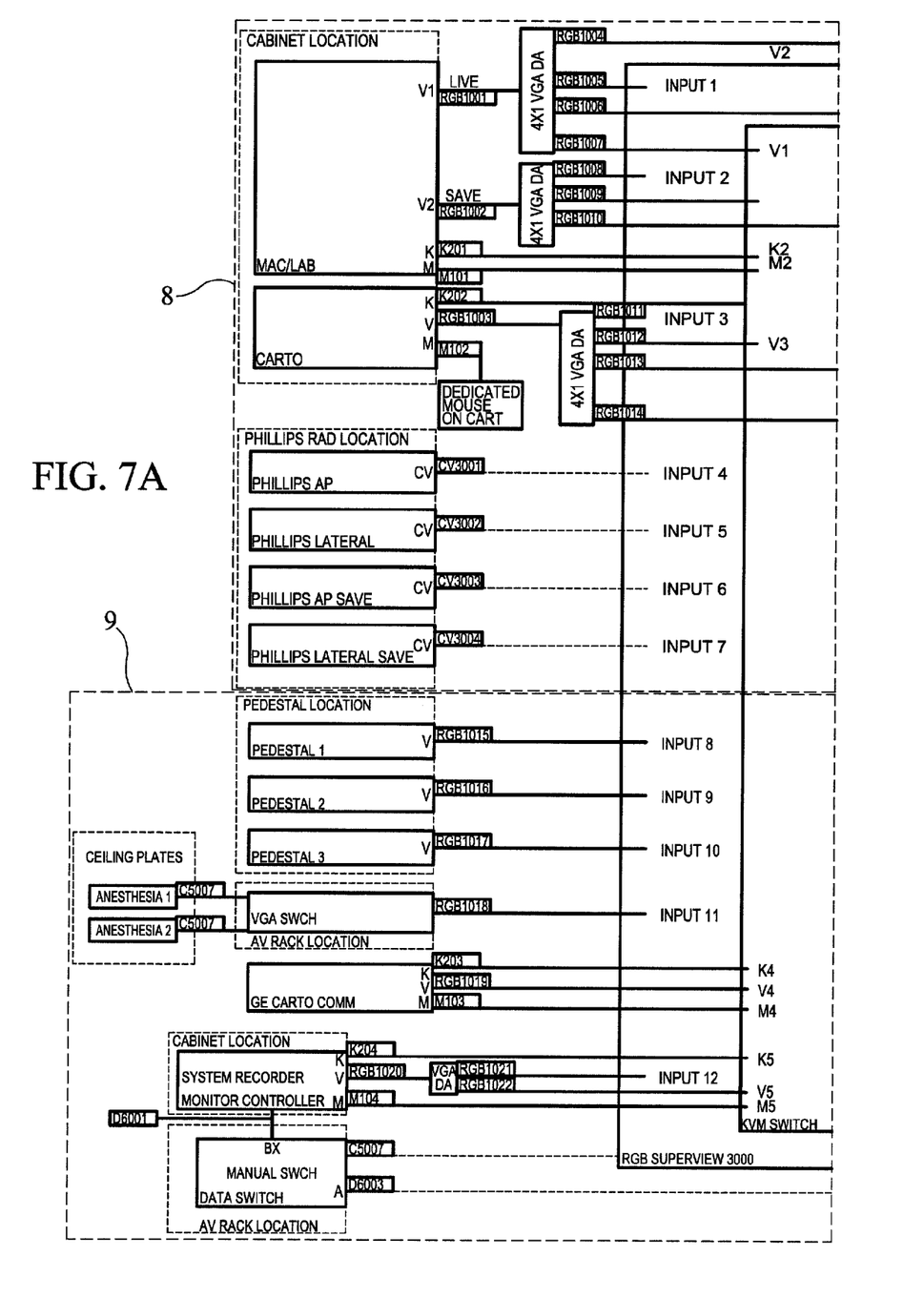
FIG. 7A and 7B are detailed block diagrams showing an exemplary systems configuration.
Figure 7B:
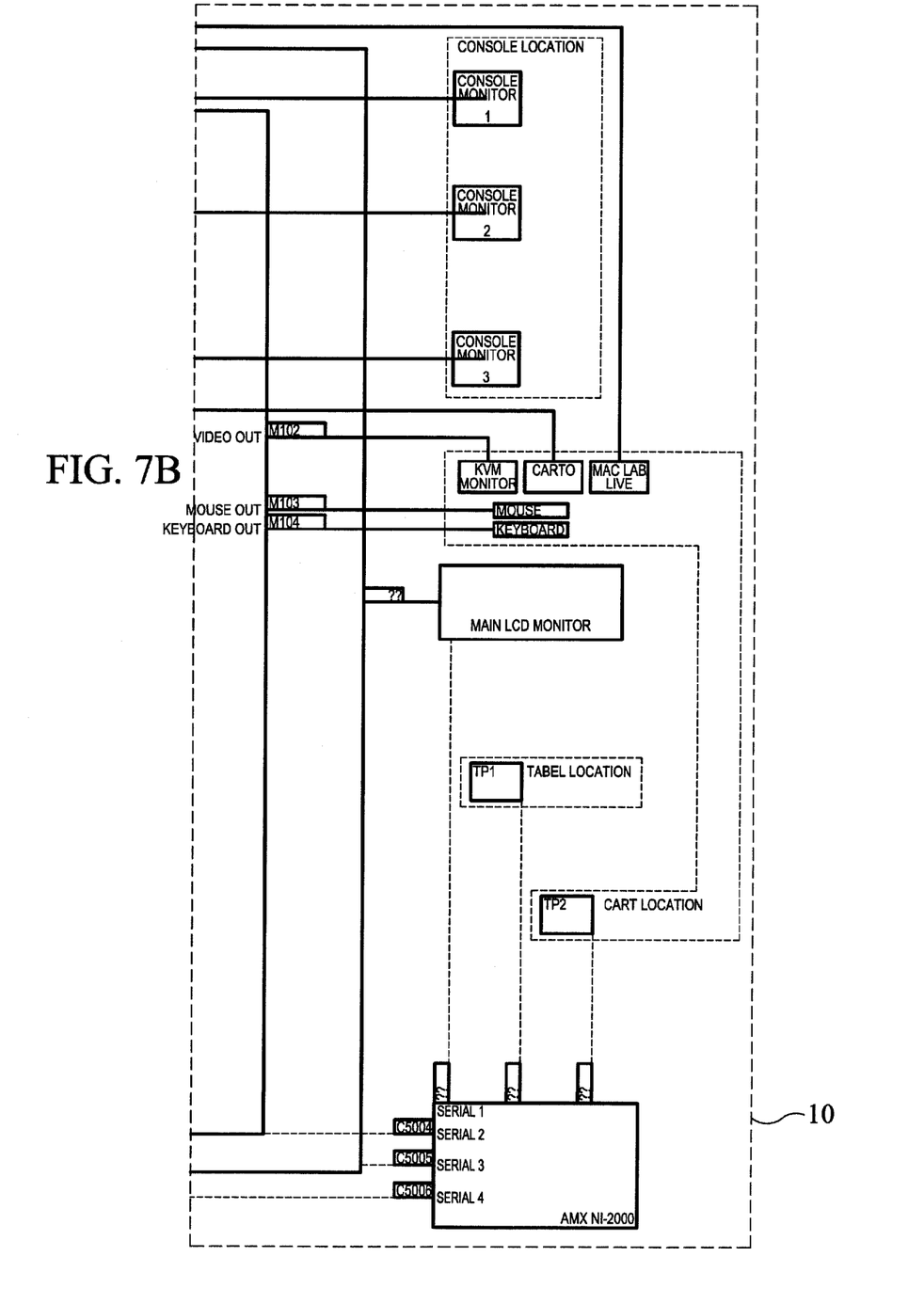
Figure 8:
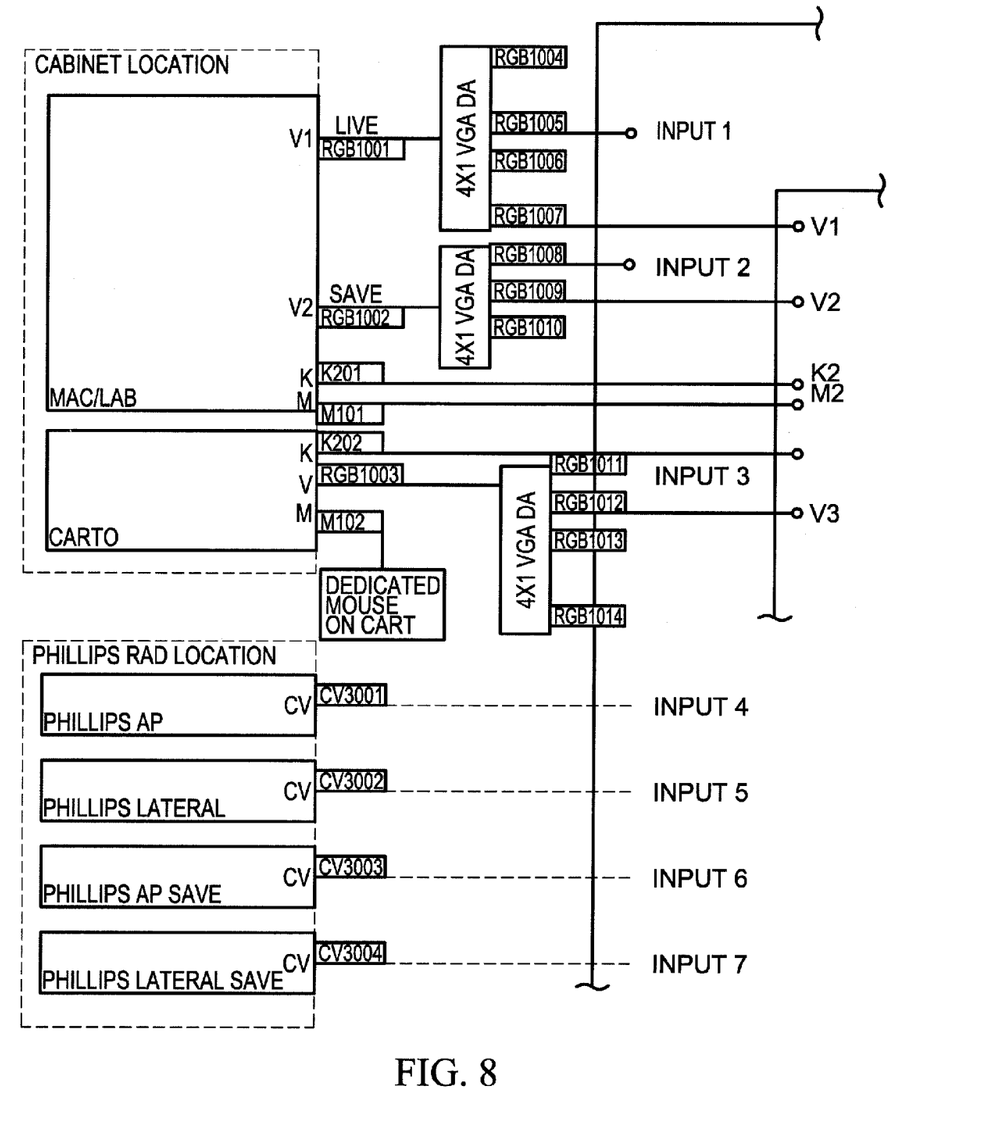
FIG. 8 is a detail inset view of a portion of FIGS. 7A and 7B, as indicated on FIGS. 7A and 7B as "8".
Figure 9:
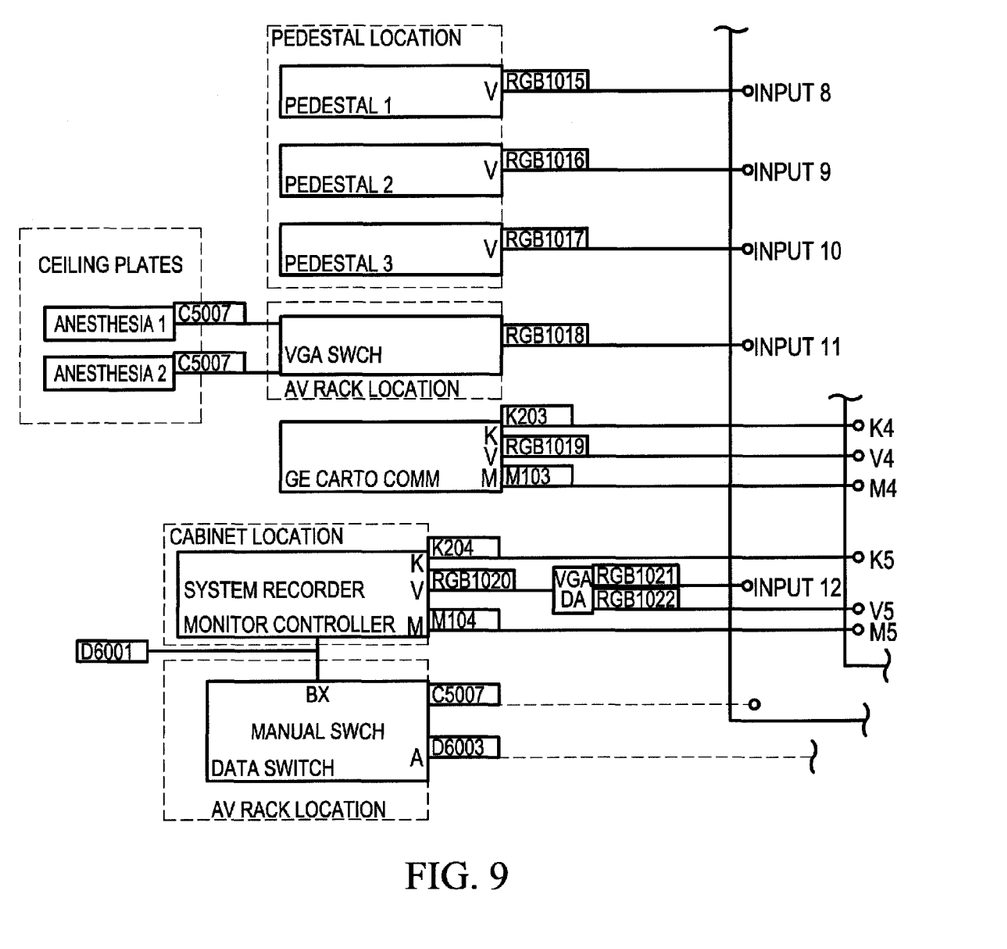
FIG. 9 is a detail inset view of a portion of FIGS. 7A and 7B, as indicated on FIGS. 7A and 7B as "9".
Figure 10:
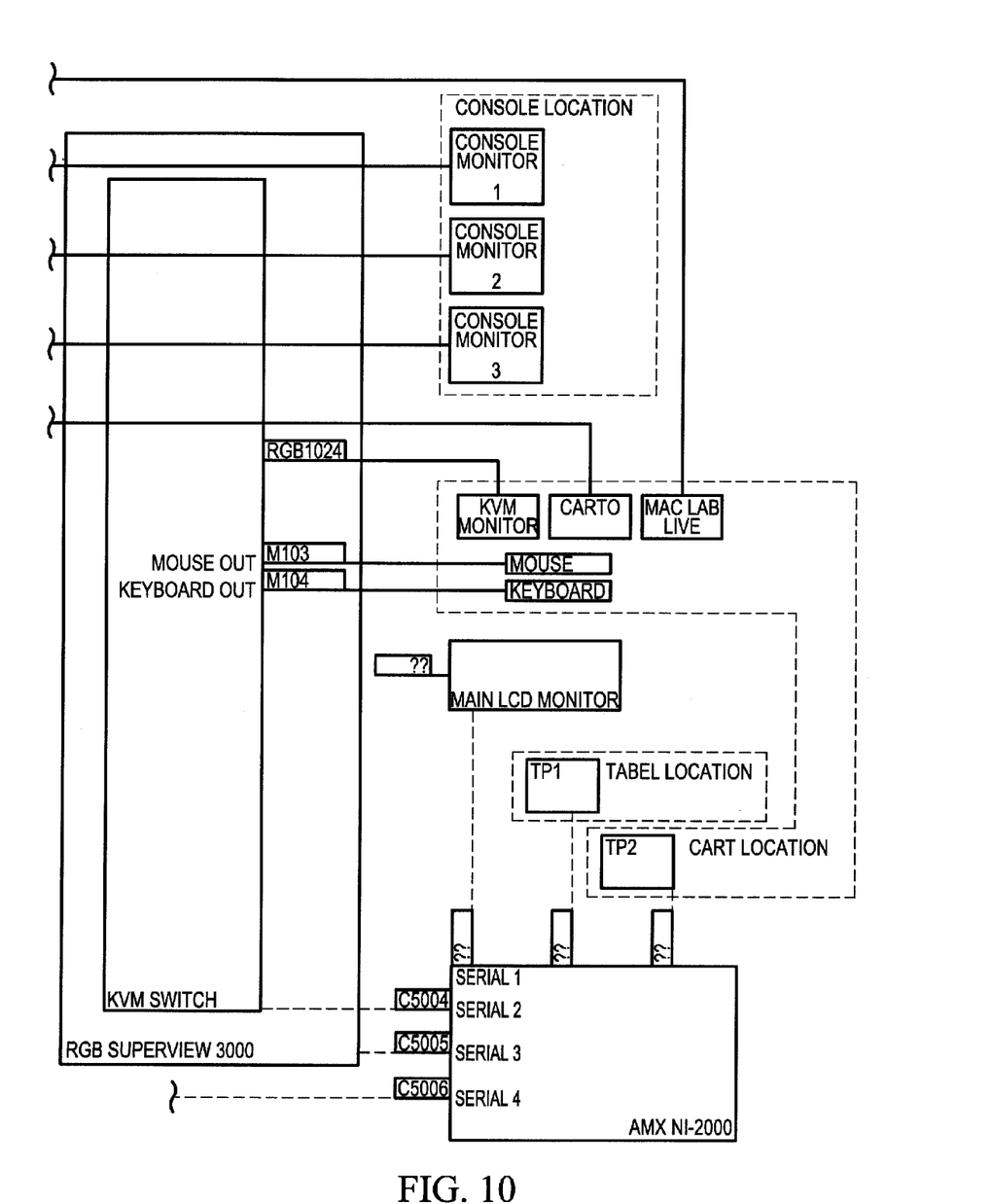
FIG. 10 is a detail inset view of a portion of FIGS. 7A and 7B, as indicated on FIGS. 7A and 7B as "10".

FIGS. 7A and 7B are detailed block diagrams showing one exemplary system configuration. Because of the size of this figure, FIGS. 8, 9, and 10, show enlarged sections of this diagram for clarity. The sections are indicated on FIGS. 7A and 7B.

Beginning on the upper left of FIGS. 7A and 7B, (shown in FIG. 8), the first cabinet shows the PRUCKA MAC/LAB system and the CARTO system. Note that these systems have video outputs (e.g. V1, and V), keyboard connections (K) and mouse connections (M). The keyboards are run to the KVM switch (on the far right of FIG. 8) Video outputs are run through video amplifiers, which are then inputted into the master video controller. The bottom of FIG. 8 shows inputs from radiology systems.

FIG. 9 shows the lower left of the diagram in FIGS. 7A and 7B. Here additional video inputs are shows (12 video inputs are provided). In addition, additional keyboards and mice are run to the KVM switch.

FIG. 10 shows the right side of FIGS. 7A and 7B. Here, console monitors are fed from the main video controller. In addition, the KVM switch feeds video out to three monitors for the functions shown as well as keyboard and mouse controls as indicated.

The monitor and touch pads are fed from the AMX NI-2000 data switch.

Note that FIGS. 7A and 7B shows the design of an exemplary system. The specific components that feed into the KVM switch and controllers may be changed as desired for the particular procedure. This diagram is designed to illustrate one way of using this invention. Obviously, in other fields, the inputs would be radically different.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A multiple-input selectable integrated display system comprising:
   a) at least two video display inputs;
   b) a video controller capable of simultaneously displaying at least two said video display inputs on a physician main display screen and on a plurality of technician displays, said video controller being in operative communication with at least two of said video display inputs;
   c) a technician keyboard-video-mouse controller in operative communication with at least two of said video display inputs, wherein said technician keyboard-video-mouse controller is adapted to selectively control at least two of said video display inputs for display on said plurality of technician displays and on said physician main display screen via said video controller;
   d) a touchpad controller in operative communication with said video controller, said technician keyboard-video-mouse controller, and at least one physician touch pad;
   e) said physician touch pad being adapted to cause said touchpad controller to control the operations of said video controller that control said physician main display screen; and
   f) said physician main display screen being adapted to display patient data in operative communication with said video controller, whereby at least two of said video display inputs are simultaneously and selectively displayed on said physician main display screen via said video controller, whereby said physician main display screen is controllable by said physician touch pad via said touch pad controller, and whereby said physician main display screen and said plurality of technician displays are independently and respectively controllable by said physician touch pad and said technician keyboard-video-mouse controller.

2. The system of claim 1 further comprising a second touch pad in operative communication with said touchpad controller.

3. The system of claim 1 wherein said video display inputs comprise between four and twelve video display inputs.

4. The system of claim 1 wherein said physician touch pad has a plurality of user-selectable buttons.

5. The system of claim 4 wherein at least two of said user-selectable buttons are programmed to display different video display inputs on said physician main display screen.

6. The system of claim 1 further comprising:
   a plurality of video amplifier splitters in operable communication with said video display inputs.

7. The system of claim 1 further comprising:
   at least one serial port converter, in operable communication with said computer.

8. The system of claim 1 wherein said physician touch pad is integral to said touch pad controller.

9. The system of claim 1 further comprising a system computer adapted to configure said video controller and operatively connected to said video controller.

10. The system of claim 9 wherein said system computer is also operatively connected to said technician keyboard-video-mouse controller.

11. The system of claim 1 wherein said operative communication between said touch pad controller, said technician keyboard-video-mouse controller, and said at least one touch pad is via a direct electrical connection.

12. The system of claim 1 wherein said physician touch pad is adapted to enable said physician to selectively re-size said video display inputs displayed on said physician main display screen.

13. The system of claim 1 wherein said physician touch pad is adapted to enable said physician to superimpose one said video display input on another said video display input on said physician main display screen.

14. The system of claim 1 wherein said physician touch pad is adapted to enable said physician to reposition said video display inputs on said physician main display screen.

15. A multiple-input selectable integrated display system comprising:
   a) a plurality of video display inputs;
   b) a computer;
   c) a video controller in operative communication with said computer and said plurality of video display inputs;
   d) a technician keyboard-video-mouse controller in operative communication with said computer, at least two of said plurality of video display inputs, a keyboard, a mouse, and a technician display;
   e) a touchpad controller in operative communication with said video controller and said technician keyboard-video-mouse controller;
   f) a first touch pad operable by a physician on a first touch screen in operative communication with said touchpad controller, said first touch pad having a plurality of user-selectable buttons displayed on said first touch pad;
   g) a second touch pad operable by a technician on a second touch screen in operative communication with said touchpad controller, wherein said second touch pad having a plurality of user-selectable buttons displayed on said second touch pad; and
   h) a physician main display screen viewable by a physician, for displaying patient data in operative communication with said video controller, whereby at least two of said plurality of video display inputs are displayed on said physician main display simultaneously and are selectable via said first touch pad or said second touch pad, and said technician keyboard-video-mouse controller selectively displays said plurality of video display inputs on said technician display, and whereby said physician main display screen and said technician display are independently controllable.

16. The system of claim 15 wherein the plurality of video display inputs comprise a total of between four and twelve video input feeds.

17. The multiple-input selectable systems integrated display system of claim 15 further comprising: a plurality of video amplifier splitters in operable communication with said plurality of video display inputs.

18. The multiple-input selectable systems integrated display system of claim 15 further comprising: at least one serial port converter, in operable communication with said computer.

19. The system of claim 15 wherein at least two of said plurality of user-selectable buttons displayed on said first touch pad are adapted to display different combinations of said video input display inputs on said physician main display screen.

* * * * *